(12) United States Patent
Schmid et al.

(10) Patent No.: US 10,639,662 B2
(45) Date of Patent: May 5, 2020

(54) APPARATUS AND METHOD FOR DISPENSING OR ASPIRATING FLUID

(71) Applicant: CSEM Centre Suisse d'Electronique et de Microtechnique SA—Recherche et Développement, Neuchâtel (CH)

(72) Inventors: Noa Schmid, Kriens (CH); Siegfried Graf, Lucerne (CH); Helmut Knapp, Ebikon (CH); Jonas Goldowsky, Lucerne (CH)

(73) Assignee: CSEM Centre Suisse d'Electronique et de Microtechnique SA—Recherche et Développement, Neuchatel (CH)

( * ) Notice: Subject to any disclaimer, the term of this patent is extended or adjusted under 35 U.S.C. 154(b) by 473 days.

(21) Appl. No.: 14/988,975

(22) Filed: Jan. 6, 2016

(65) Prior Publication Data
US 2016/0193615 A1  Jul. 7, 2016

(30) Foreign Application Priority Data

Jan. 7, 2015 (EP) .................................... 15150359

(51) Int. Cl.
*B05B 1/30* (2006.01)
*B05B 12/08* (2006.01)
(Continued)

(52) U.S. Cl.
CPC .......... *B05B 12/087* (2013.01); *B01L 3/0293* (2013.01); *B05B 1/30* (2013.01);
(Continued)

(58) Field of Classification Search
CPC .......... B01L 3/0293; B01L 2400/0633; B01L 2200/147; B01L 2200/146;
(Continued)

(56) References Cited

U.S. PATENT DOCUMENTS 5,193,990 A  3/1993 Kamen
5,568,882 A  10/1996 Takacs
(Continued)

FOREIGN PATENT DOCUMENTS

WO  WO-2011128607 A1 * 10/2011 ............. B65D 83/48

OTHER PUBLICATIONS

Extended European Search Report dated Jun. 29, 2015, issued in corresponding European Application No. 15150359.6, filed Jan. 7, 2015, 7 pages.

*Primary Examiner* — Paul R Durand
*Assistant Examiner* — Robert K Nichols, II
(74) *Attorney, Agent, or Firm* — Christensen O'Connor Johnson Kindness PLLC

(57) ABSTRACT

A method dispenses and/or aspirates a predetermined volume of fluid from a chamber. The chamber includes a lower portion containing fluid and an upper portion containing gas. The method includes measuring an initial pressure in the upper portion and introducing or evacuating a known quantity of gas into or out of the upper portion. The volume of gas in the upper portion is determined based on the volume of gas introduced or evacuated from the upper portion and a measured change in pressure in the upper portion. An upper portion target pressure that will dispense or aspirate a predetermined volume of fluid is determined. A controllable valve is opened while the pressure in the upper portion of the chamber is monitored. Once the target pressure is reached, the predetermined volume of fluid has been dispensed or aspirated, and the controllable valve is then closed.

6 Claims, 4 Drawing Sheets

(51) Int. Cl.
*B05B 11/00* (2006.01)
*B01L 3/02* (2006.01)
*G01F 22/02* (2006.01)
*G01N 35/10* (2006.01)
*G01F 11/10* (2006.01)

(52) U.S. Cl.
CPC ...... *B05B 11/0044* (2018.08); *B05B 11/3042* (2013.01); *B01L 2200/146* (2013.01); *B01L 2200/147* (2013.01); *B01L 2400/0487* (2013.01); *B01L 2400/0633* (2013.01); *G01F 11/10* (2013.01); *G01F 22/02* (2013.01); *G01N 35/1016* (2013.01)

(58) Field of Classification Search
CPC .. B01L 2400/0487; G01F 11/10; G01F 22/02; G01N 35/1016; B05B 11/3042; B05B 11/0016; B05B 1/30; B05B 12/087
USPC .................. 222/1, 71, 386.5, 399, 400.5, 61
See application file for complete search history.

(56) References Cited

U.S. PATENT DOCUMENTS

| | | | |
|---|---|---|---|
| 6,460,730 B1 | 10/2002 | Liedtke | |
| 6,543,236 B2* | 4/2003 | Zollinger | A61K 49/1815 222/3 |
| 6,616,013 B2* | 9/2003 | Tansley | B67D 1/0009 141/67 |
| 7,097,070 B2* | 8/2006 | Massaro | B01L 3/021 222/1 |
| 7,779,856 B2* | 8/2010 | Adams | H01M 8/04208 137/210 |
| 8,220,502 B1 | 7/2012 | Kelekar | |
| 2006/0157515 A1* | 7/2006 | Oswald | B67D 1/07 222/399 |
| 2007/0264130 A1* | 11/2007 | Mallett | A61M 5/14526 417/38 |
| 2013/0081443 A1* | 4/2013 | Rasmussen | B67D 1/0431 73/19.06 |

* cited by examiner

APPARATUS AND METHOD FOR DISPENSING OR ASPIRATING FLUID

FIELD OF THE DISCLOSURE

The present invention relates to the field of dispensing and/or aspirating fluids. More particularly, it relates to a pressure-driven apparatus and method for dispensing and/or aspirating fluid.

BACKGROUND OF THE DISCLOSURE

Fluid dispensing is a critical process in a broad range of applications. Not only in medical and biomedical fields, but also in many industrial applications precise amounts of liquid have to be dispensed and/or aspirated. Hence a large number of principles have been found addressing the needs of the individual applications.

An industrially widely used dispensing approach is "Time Pressure Dispensing" (TPD). TPD is a method of dispensing liquid materials (such as surface mount adhesives and gasketing materials) that uses air pressure applied to the top of a syringe to force material through a needle. The amount of time the air pressure is applied is directly related to the amount of liquid material dispensed. Common time pressure dispensing setups are easily implemented. However, TPD allows no feedback of the liquid dispensed during the dispensing cycle. Especially syringe fill-level, viscosity of the medium, syringe to syringe variation and clogging are influencing the amount of liquid dispensed. Measures to account for those disturbance variables are matter of current research activities. (Dixon, D., 2004. *Time Pressure Dispensing*. White papers. Available at: https://www4.uic.com/wcms/images2.nsf/%28GraphicLib %29/Time_Pressure_Dispensing.PDF/$File/Time_Pressure_Dispensing.PDF; Chen, C.-P., Li, H.-X. & Ding, H., 2007. *Modeling and control of time pressure dispensing for semiconductor manufacturing*. International Journal of Automation and Computing, 4(4), pp. 422-427. Available at: http://link.springer.com/10.1007/s11633-007-0422-8).

In biomedical and laboratory applications most often volume defined pumps are used. Syringe pumps allow precise dispensing of small volumes. However, they are expensive and bulky. Alternatively, peristaltic pumps, smaller and lower in cost, can be used which create a pulsating flow, which can be problematic in many applications. Generally all pumping mechanisms can be used and observed with a flowmeter within the liquid path. The flowmeter itself often has to be calibrated and gives output correlating with the media physical properties such as viscosity.

Other examples of high-precision dispensing arrangements are disclosed in WO 9217339, in which volume is determined by counting productive and unproductive strokes of a positive displacement pump, and in U.S. Pat. No. 5,193,990, which utilises an auxiliary dispensing chamber with variable volume.

U.S. Pat. No. 6,460,730 further discloses an apparatus comprising a tank containing a fluid and connected by an inlet line to a pressurized gas supply by means of a first pressure sensor and a valve, both operatively connected to a control unit. At an outlet the tank is connected to a dispensing valve arranged and sensor arranged in the fluid feed line and also connected to the control unit so as to open a feed line for dispensing fluid from the tank.

Finally U.S. Pat. No. 5,568,882 discloses a fluid dispenser system comprising a pressure vessel, a supply tank for supplying a fluid, a bubbler sensor, a dispense pressure supply, a dispense tank for receiving the fluid from the pressure vessel and a controller, which measures a volume of fluid to be received and dispensed by the pressure vessel. A solenoid valve piloted by the controller and located downstream the pressure opens or closes the inlet/outlet lines to supply fluid to the pressure vessel or dispense fluid from the pressure vessel to the dispense tank upon gas pressure measurements in the pressure vessel.

Nevertheless, none of the above-mentioned prior art permits accurate determination of a volume of fluid dispensed or aspirated which is simple, compact, does not require a flow meter or any sensing element in the liquid path to determine precisely the volume of fluid to be dispensed, and is unaffected by partial clogging of conduits, liquid viscosity and so on.

An aim of the present invention is thus to at least partially overcome at least some of the above-mentioned drawbacks of the prior art.

SUMMARY OF THE DISCLOSURE

More specifically, the invention relates to an apparatus for dispensing and/or aspirating (i.e. only dispensing, only aspirating, or both dispensing and aspirating) a predetermined volume of fluid, such as a liquid or a gel, from a chamber, the chamber, which does not necessarily have to be part of the apparatus, comprising a lower portion and an upper portion, the lower portion (as defined with respect to gravity), for containing fluid such as a liquid, a gel, a solution, a suspension or similar, the upper portion for containing gas such as air or any other compressible gas.

The apparatus further comprises a controllable valve connectable with the lower portion of the chamber so as to be in fluid communication with said lower portion of the chamber, a pressure sensor arranged to be in gaseous communication with the upper portion of the chamber, either directly in the chamber, connected to the chamber, or connected to a conduit leading to the chamber so as to measure the pressure therein, and a pump adapted to be in gaseous communication between a source of gas and the upper portion of the chamber.

A controller is also provided in operative connection with the controllable valve, the pressure sensor and the pump, the controller being adapted to determine a volume of fluid to be dispensed or aspired from the chamber from gas pressure measurements from the pressure sensor in the upper portion of the chamber and to control operation of the pump and operation of the controllable valve in function of said measurements from the pressure sensor.

In consequence, an apparatus is proposed which is particularly adapted to aspirate or dispense a desired quantity of fluid without requiring a priori knowledge of the volume of the chamber or the volume of fluid therein, particularly by means of the method described below. Furthermore, this setup enables the precise dispensing or aspirating of fluids independent of the viscosity thereof, in which the created flow is pulsation free since it is pressure driven, and in which no flow sensor is in contact with the liquid to be dispensed.

Advantageously, the pump is a cyclical pump, and wherein the controller is adapted to count a number of pump cycles during operation of the pump. This counting can take place either by commanding the pump to operate a particular number of cycles, or by counting a signal generated by the pump indicating that it has carried out a cycle. The pump may be a reciprocating pump.

Alternatively, a flowmeter may be provided in fluid communication with the pump and is arranged to measure a flow of gas, said flowmeter being in operative connection with the controller. Thus, any type of pump or even an external pressure source can be used.

Advantageously, a temperature sensor is provided, and is arranged to measure the temperature in the chamber so as to be able to correct measurements for temperature.

Advantageously, the apparatus further comprises a controllable access valve arranged between the pressure sensor and the pump and in operational connection with the controller. This permits defining an aspirating/dispensing unit comprising the ensemble of the controllable access valve, the pressure sensor, and the controllable valve, which permits a plurality of said aspirating/dispensing units being provided so as to form a manifold aspirator/dispenser.

In an embodiment, the apparatus of the invention further comprises a container for receiving said controllable valve, said pressure sensor, said pump and said controller, said container comprising a fluid inlet for introducing or removing gas into the upper portion of the chamber and a fluid outlet for delivering or aspirating a predetermined quantity of said fluid from the bottom portion of the chamber. Such a container provides for compact and preferably fluid tight containment of the operative components of the apparatus. Preferably, the container is advantageously sealed so as to prevent any ingress of liquid or gel therein during use, except through its inlet or outlet.

Further advantageously in such embodiment, a hydrophobic membrane may be arranged at the inlet for introducing gas of the apparatus. Such hydrophobic membrane help in particular preventing fluid contained in the chamber to flow through the inlet towards the pressure sensor and the pump, for example when the chamber is moved upside-down during use or accidentally.

In a further embodiment of the apparatus of the invention, in particular to help implementation thereof independently of the type of chamber containing the fluid, the apparatus container may advantageously be chosen as a cap for closing a flask, said cap defining said container and being closed by an internal bottom wall sealed to the side flanges of the cap.

The invention also relates to a method for dispensing and/or aspirating a predetermined volume of fluid. This method comprises first providing an apparatus according to any preceding claim and a chamber connected thereto such that the upper portion of the chamber is in fluid communication with the pump and such that the lower portion of the chamber is in fluid communication with the controllable valve, and subsequently providing fluid in the lower portion of the chamber and a volume of gas in the upper portion of the chamber. This volume of gas may simply be the air which is pre-existing in the chamber.

An initial pressure in the upper portion of the chamber is measured by means of the pressure sensor, and then a known quantity of gas is introduced into (in the case of dispensing) or is evacuated out of (in the case of aspirating) the upper portion of the chamber.

A first pressure in the upper portion of the chamber is measured by means of the pressure sensor. By means of said known quantity of gas, said initial pressure and said first pressure, the volume of gas in the upper portion of the chamber is determined by calculation.

A target pressure of the upper portion of the chamber is then determined, said target pressure being calculated so as to dispense or to aspirate said predetermined volume of fluid, and the controllable valve is opened while monitoring the pressure in the upper portion of the chamber by means of the pressure sensor. Once the target pressure is reached, the predetermined volume of fluid has been dispensed or aspirated, and the controllable valve is then closed.

In consequence, a priori knowledge of the volume of the chamber or the volume of fluid therein is not required, precise dispensing or aspirating of fluids can be performed independent of the viscosity thereof, the created flow is pulsation free since it is pressure driven by a static pressure, and in which no flow sensor is in contact with the liquid to be dispensed.

Advantageously, the known quantity of gas is a predetermined number of moles of gas.

Alternatively, the first pressure can be predetermined, and said known quantity of gas is a number of moles of gas measured so as to attain said predetermined second pressure.

Advantageously, the volume of gas $V_1$ is determined by the following equation:

$$V_1 = \frac{(n_1 - n_0)RT}{(P_1 - P_0)}$$

wherein $(n_1-n_0)$ is the number of moles of gas displaced by the pump, R is the ideal gas constant, T is the temperature, $P_0$ is the initial pressure and $P_1$ is the first pressure. $(n_1-n_0)$ can be determined by the equation $(n_1-n_0)=f_{\Delta n}(P_1)$ $s_0$, wherein $f_{\Delta n}(P_1)$ is a predetermined calibration curve of the pump, and $s_0$ is a function of the operation of the pump determined by the controller.

The pump may be a reciprocating pump and in such a case, $s_0$ is the number of strokes of the pump.

Target pressure P2 can be determined by the equation $$P_2 = \frac{V_1^k}{(V_1 + \Delta V)^k} P_1$$

where $V_1$ is the gas volume within the containment before dispensing, $\Delta V$ the dispensed or aspirated liquid volume, k the polytropic exponent, $P_1$ is the pressure in the chamber before dispensing or aspirating.

Finally, the invention relates to an apparatus as defined above specifically adapted to perform the method as defined above.

BRIEF DESCRIPTION OF THE DRAWINGS

Further details of the invention will become more apparent with reference to the following description and the accompanying figures, in which.

DETAILED DESCRIPTION

In the following figures, thick lines indicate fluid connections, dashed lines indicate electrical connections, and chain lines group components in functional groups. Similar reference signs indicate the same or similar components.

Figure 1:
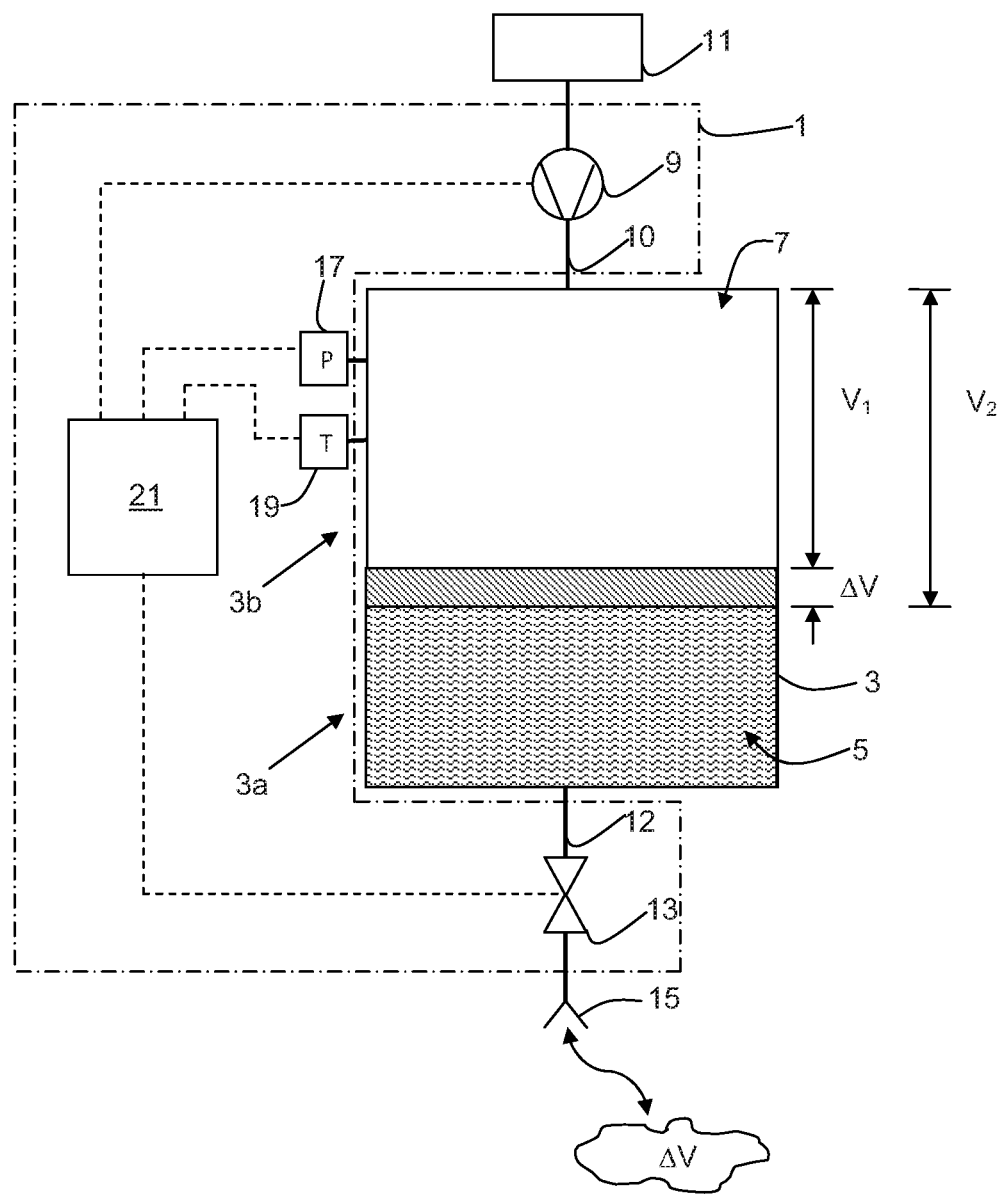
FIG. 1 represents schematically an apparatus according to the invention.

FIG. 1 illustrates schematically a generic embodiment of an apparatus 1 according to the invention, fully assembled with a chamber 3, ready for use. The chain line defines the components considered as being part of the apparatus 1, since the apparatus 1 can be used with any convenient chamber 3, which may for instance simply be a lab flask. In such a case, the apparatus of the invention can advantageously be arranged in a container represented by the chain line, said container being in an example a cap for a said lab flask. Alternatively, apparatus 1 may also comprise an integrated chamber 3. In the unassembled state, the various components are simply arranged to be connected in fluid communication with the chamber 3 according to the illustrated arrangement.

Chamber 3 for holding fluid 5, which can be a liquid, a gel, a solution, a suspension, or similar. As such, chamber 3 serves as a reservoir for said fluid 5. Chamber 3 is arbitrarily divided into a lower portion 3a, in which an initial volume $V_0$ of fluid 5 is situated or, in the case in which no fluid is present, is destined to be situated, and an upper portion 3b, in which gas 7 such as air, nitrogen, argon, oxygen, carbon dioxide, or any other suitable gas 7 can be situated. The exact choice of gas 7 used depends on the nature of the fluid 5, in particular its reactivity, susceptibility to oxidation, biological contamination, and so on. "Upper" and "lower" are defined with respect to gravity in the operational orientation of the chamber 3. Chamber 3 should be constructed of a material which is sufficiently stiff that the changes in pressure resulting from operation of the apparatus substantially do not change the shape of the chamber 3, and thus expansion or contraction of the chamber do not need to be taken into account when calculating the quantity of fluid dispensed of aspirated.

A pump 9 is arranged in fluid communication, more specifically in gaseous communication, with the upper portion 3b of chamber 3 and with a source of gas 11 via a suitable conduit 10 such as a tube. Source of gas 11 may simply be an air inlet, or may be a cylinder containing another gas in the case in which the fluid 5 is incompatible with air for chemical or biological reasons. Pump 9 may be bidirectional, permitting both dispensing and aspirating fluid 5, or unidirectional, which in the illustrated embodiment permits one or the other of aspirating or dispensing fluid 5. A variant permitting both aspiration and dispensing with a unidirectional pump is described below in reference to FIG. 5.

Pump 9 is ideally a positive displacement pump, i.e. a pump which displaces a known, constant volume of material for a given input. Such pumps can be reciprocating or rotary, and the skilled person is aware of a large variety of such pumps. Alternatively, pump 9 may be velocity pump combined with a flowmeter (not illustrated) in series with the pump so as to be able to determine the volume, and hence the quantity in moles, of gas pumped.

Moving now to the lower portion 3a of chamber 3, lower portion 3a is in fluid communication with a controllable valve 13 via a suitable conduit 12, the controllable valve being in fluid communication with a nozzle 15. Nozzle 15 is thus in selective fluid communication with the lower portion 3a of chamber 13, controllable valve 13 serving to selectively connect the nozzle 15 to the lower portion 3a of chamber 3.

A pressure sensor 17 is arranged in fluid communication, more specifically in gaseous communication, with the chamber 3, particularly the upper portion 3b thereof, so as to measure the pressure therein. As illustrated, pressure sensor 17 is directly connected to upper portion 3b of chamber 3, as would usually be the case in which the chamber 3 is integral to the apparatus; however it can equally be arranged inside chamber 3 or mounted in or connected to conduit 10 as is the case in the variants of FIGS. 4 and 5. In the case of using a standard laboratory flask or other convenient vessel as chamber 3, the pressure sensor can be attached to the inside of the cap of the flask so as to be situated inside the flask. This is particularly convenient in the case in which the flasks need to be changed.

Optional temperature sensor 19 likewise is arranged so as to measure the temperature of the gas 7 in the chamber 3. This can be important for non-adiabatic and non-isothermic changes of condition.

Finally, controller 21 is operatively connected with the following other components of the apparatus 1:

pump 9 so as to control its operation and, if applicable, to count rotations, strokes, or other parameters of its operation;

pressure sensor 17 so as to measure pressure in the upper portion 3b of chamber 3;

temperature sensor 19 so as to measure temperature in the upper portion 3b of chamber 3;

controllable valve 13, so as to control its opening and closing so as to dispense or aspirate, as desired, a quantity $\Delta V$ of fluid 5.

Figure 2:
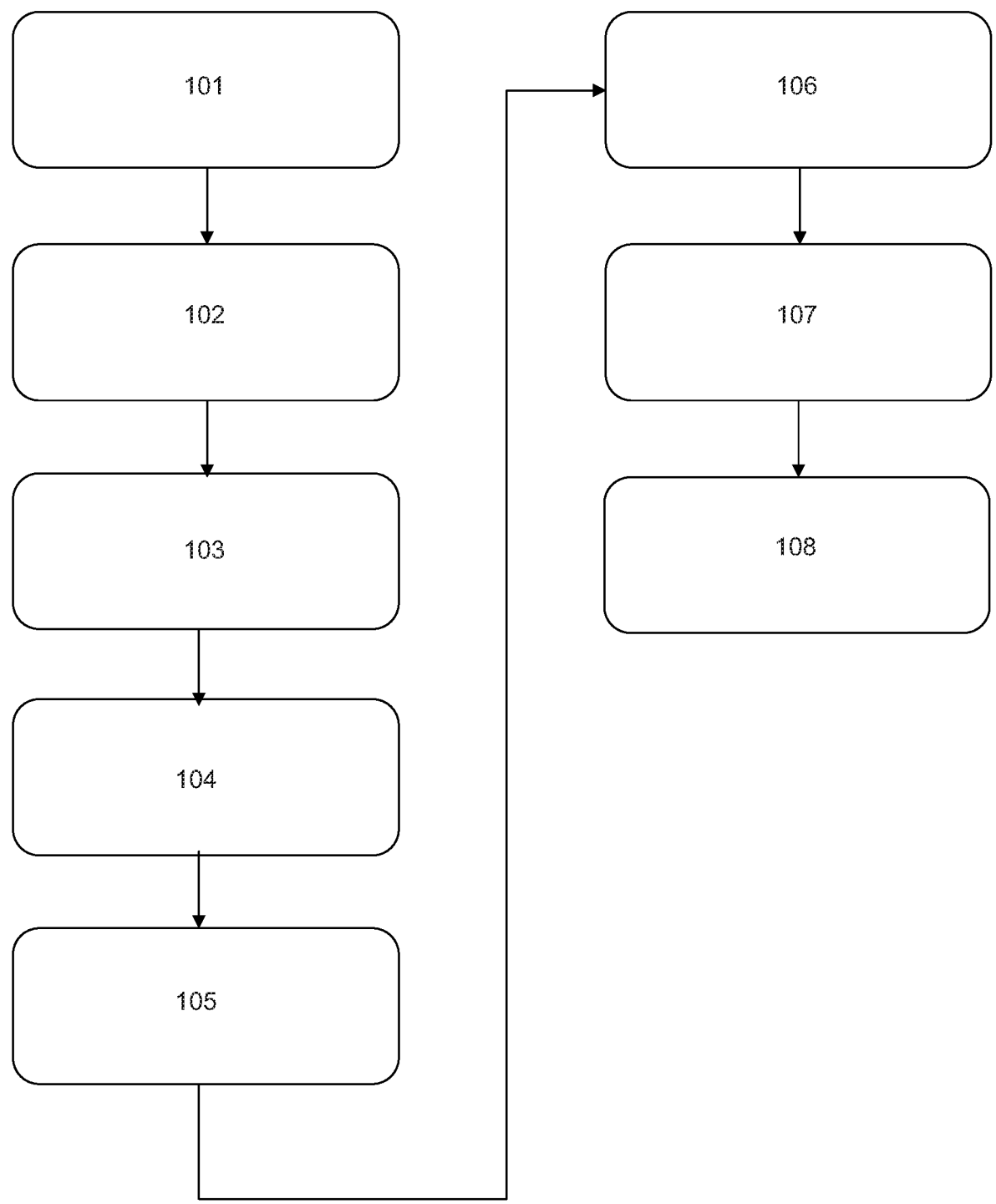
FIG. 2 represents a flow diagram of a method according to the invention.
Figure 3:
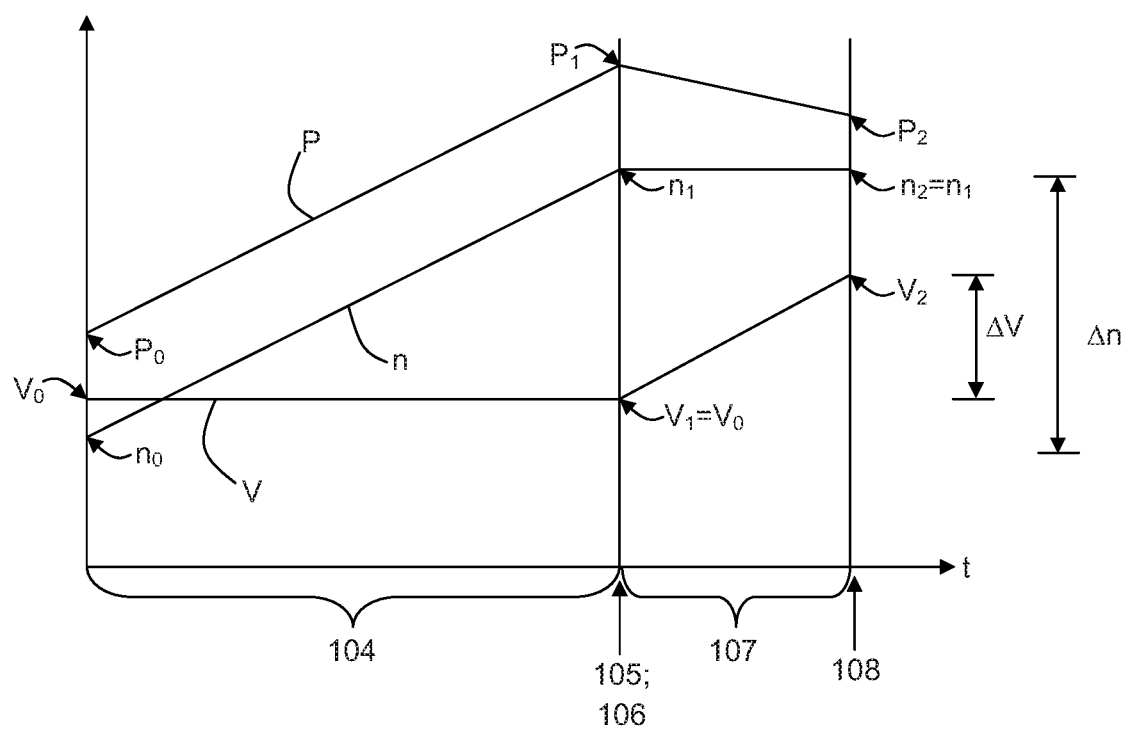
FIG. 3 represents schematically a graph of various parameters of the gas in the chamber and how they change with time when carrying out the method.

FIG. 2 illustrates a flow diagram of a method for dispensing or aspirating a predetermined volume of fluid according to the invention, and FIG. 3 represents volume V, pressure P and molarity n curves for the gas 7 in the chamber 3 during the measurement phases of the method when used for dispensing. In the case of aspiration, the various curves will simply have the opposite slopes, while the principle of operation remains the same.

Firstly, in step 101 an apparatus 1 according to the invention is provided. In step 102, fluid 5 is provided in the chamber 3. If the gas 7 is air, it has already been provided in the upper portion 3b of chamber 3, whereas if the gas 7 is other than air, the air already existing in the upper portion 3b of chamber 3 may be purged therefrom by displacing it with the desired gas 7.

When it is desired to aspirate or dispense a quantity $\Delta V$ of fluid 5, in step 103 a first pressure measurement $P_0$ is taken by means of the pressure sensor 17, and if required, a temperature measurement T is taken by means of the temperature sensor 19.

Subsequently, in step 104, the controller 21 causes pump 9 to operate so as to add (in the case of dispensing fluid) or remove (in the case of aspirating fluid) a known quantity of gas 7 from the upper portion 3b of chamber 3. In the dispensing example illustrated in FIG. 3, a quantity of gas 7 is added.

There are several ways to determine this known quantity of gas 7. Firstly, the pump may be operated until a predetermined pressure $P_1$ is measured in the chamber 3, the operation of the pump 9 being monitored so as to determine the volume of gas at the temperature and pressure upstream of the pump which has been pumped. This temperature and pressure can be determined e.g. by further temperature and pressure sensors. For instance, in the case of a reciprocating pump, the number of pump cycles may be counted, and a calibration curve used to determine the amount of gas, expressed in moles, pumped. In the case of a flowmeter being used, the controller 21 measures directly the volume pumped at the appropriate temperature and pressure, which can then be converted into moles via the well-known ideal gas equations, data tables or similar.

Alternatively, a predetermined quantity of gas 7 can be pumped, and the pressure $P_1$ measured after this pumping.

In either case, the system can be assumed to be substantially isothermal if the speed of pumping is low in comparison to the thermal mass of the system and the rates of heat loss from the gas 7 in the chamber 3. In the opposite case, the pumping can be assumed to be isentropic. If required for the calculation methodology chosen, the continuous reduction in pressure may need to be taken into account when determining the quantity of gas 7 pumped as a function of the operation of the pump 9. For this purpose, pressure sensor 17 can take continuous measurements, which controller 21 can use to calculate the quantity of gas pumped. Other calculation methodologies may simply need only a before and after pressure measurement.

Once pressure $P_1$ has been reached, in step 105 the volume $V_1$ (incidentally equal to $V_0$ since this volume does not substantially change when pressure P is increased) of gas 7 in the chamber can be measured on the basis of $P_0$, $P_1$, the temperature, and the quantity of gas pumped.

Most generically, $V_1$ can be calculated based on the following equation:

$$V_1 = \frac{(n_1 - n_0)RT}{(P_1 - P_0)}$$

where $(n_1-n_0)$ is the number of moles of gas pumped by pump 9, R is the ideal gas constant, and T is the temperature.

Taking a specific concrete example of a reciprocating pump 9 in which a number of strokes of the pump 9 can be counted, $(n_1-n_0)$ can be calculated as $(n_1-n_0))=f_{\Delta n}(P_1)s_0$, wherein $f_{\Delta n}(P_1)$ is a predetermined calibration curve of the pump 9, i.e. the delivery rate as a function of counterpressure on the chamber 3 side of the pump 9, and $s_0$ is the number of strokes of the pump 9 counted by the controller 21. An advantage of such a calibration curve based on counterpressure is that it is independent of whether the pump is increasing or decreasing the pressure in the chamber 3. Alternative equations based on the pressure of the gas supply can also be envisaged.

The resulting equation is thus:

$$V_1 = \frac{f_{\Delta n}(P_1)s_0 RT}{(P_1 - P_0)}$$

The skilled person understands how to adapt this equation to other types of pump, including velocity pumps used in combination with a flow meter either upstream or downstream of the pump. For instance, for a lobe pump or a gear pump, the angle through which the pump drive turns, or the number of turns of the pump can be measured, and an appropriate calibration curve used.

In step 106, on the basis of pressure $P_1$ and the calculated volume $V_1$ of gas in the chamber 3, a target pressure P2 can be calculated for aspirating or dispensing a desired volume $\Delta V$ of fluid. To calculate P2 for a desired $\Delta V$ to be dispensed or aspirated, the following equation can be used:

$$P_2 = \frac{V_1^k}{(V_1 + \Delta V)^k} P_1$$

where $V_1$ is the gas volume within the containment before dispensing, $\Delta V$ the dispensed liquid volume, k the polytropic exponent (the process may be isothermal or isentropic depending on system properties and gas expansion rate), $P_1$ and $P_2$ the pressure within the chamber 3 before and after dispensing or aspirating, respectively.

In step 107, the controller 21 causes controllable valve 13 to open, and monitors the pressure P in the chamber 3 as it rises or falls. Once target pressure P2 is reached, the controller 21 closes valve 13 as final step 108. The desired volume $\Delta V$ is thus aspirated or dispensed in function of signals from the pressure sensor 17.

As can be seen from the above equations, it is not required to know a priori the volume of the chamber 3, or the quantity of fluid 5 therein, since these equations are entirely independent thereof. The apparatus 1 can thus be used with any desired chamber 3. Furthermore, no flowmeter or other equipment needs to be placed in the fluid path, removing the risk of contamination, failure of such a flowmeter, viscosity-related problems, or similar.

Figure 4:
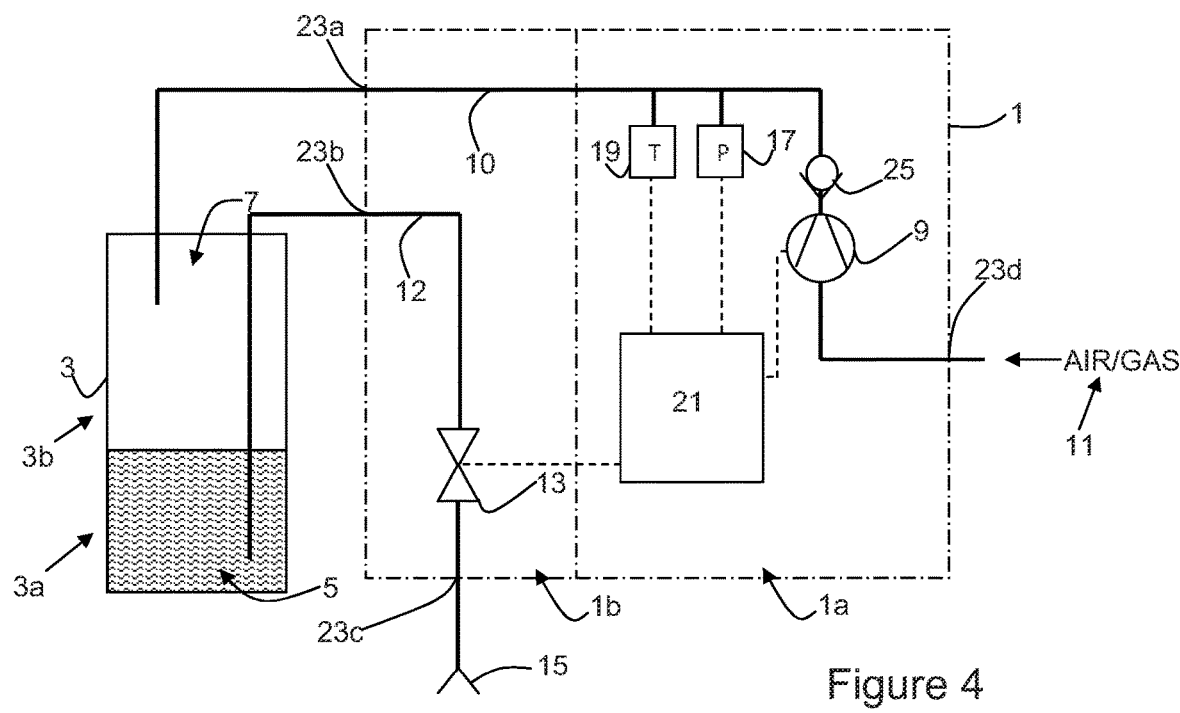
FIG. 4 represents schematically a variant of an apparatus according to the invention.

FIG. 4 illustrates a particularly advantageous configuration of the apparatus 1 for use with a standard laboratory flask as chamber 3. In such a configuration, apparatus 1 is provided as a single unit provided with four ports, 23a, 23b, 23c and 23d. Port 23a leads from pump 9 is intended to be connected to a conduit passing through the cap of the flask and opening in upper portion 3b of chamber 3; port 23b leads to the controllable valve 13 and is intended to be connected to a conduit passing through the sealed cap of the flask and opening in lower portion 3a of chamber 3, below the intended level of fluid 5, and port 23c leads from controllable valve 13 is intended to be connected to nozzle 15. Port 23d leads to the pump 9 and is intended to be connected to a supply of air or another gas. Indeed, in the case in which the gas 7 is air, port 23d can be left open, or connected to a simple air filter to prevent ingress of dust. In the illustrated setup, the ports 23a-d are indeed connected with their intended components via appropriate conduits. Preferably, a hydrophobic membrane is arranged at port 23a to prevent liquid from reaching pump and pressure sensor of the apparatus when the flask serving as fluid chamber is turned upside down.

Contrary to the arrangement illustrated in FIG. 1, pressure sensor 17 and temperature sensor 19 are integrated in apparatus 1 and are fluidically connected to the conduit extending between pump 9 and port 23a, so as to measure temperature and pressure in this conduit. As such, pressure sensor 17 and temperature sensor 19 are in fluid communication with the upper portion 3b of the chamber 3, via this conduit, port 3a, and the conduit opening in upper portion 3b of chamber 3. A further controllable valve may also be provided between pump 9 and port 23a, on either side of one or more of the sensors 17, 19. Furthermore, an optional check valve 25 may be provided adjacent to the pump 9 on one or the other sides thereof so as to prevent flow of gas 7 in an undesired direction.

It should be noted that apparatus 1 may be divided into a control unit 1a comprising controller 21, pump 9, temperature sensor 19 and pressure sensor 17, and a dispensing/aspirating unit 1b comprising controllable valve 13.

The arrangement of FIG. 4 can be used with a unidirectional pump 9 for either exclusively aspirating or exclusively dispensing fluid 5, or with a bidirectional pump 9 for both aspirating and dispensing. As such, it is suitable for use as a pipette system.

Figure 5:
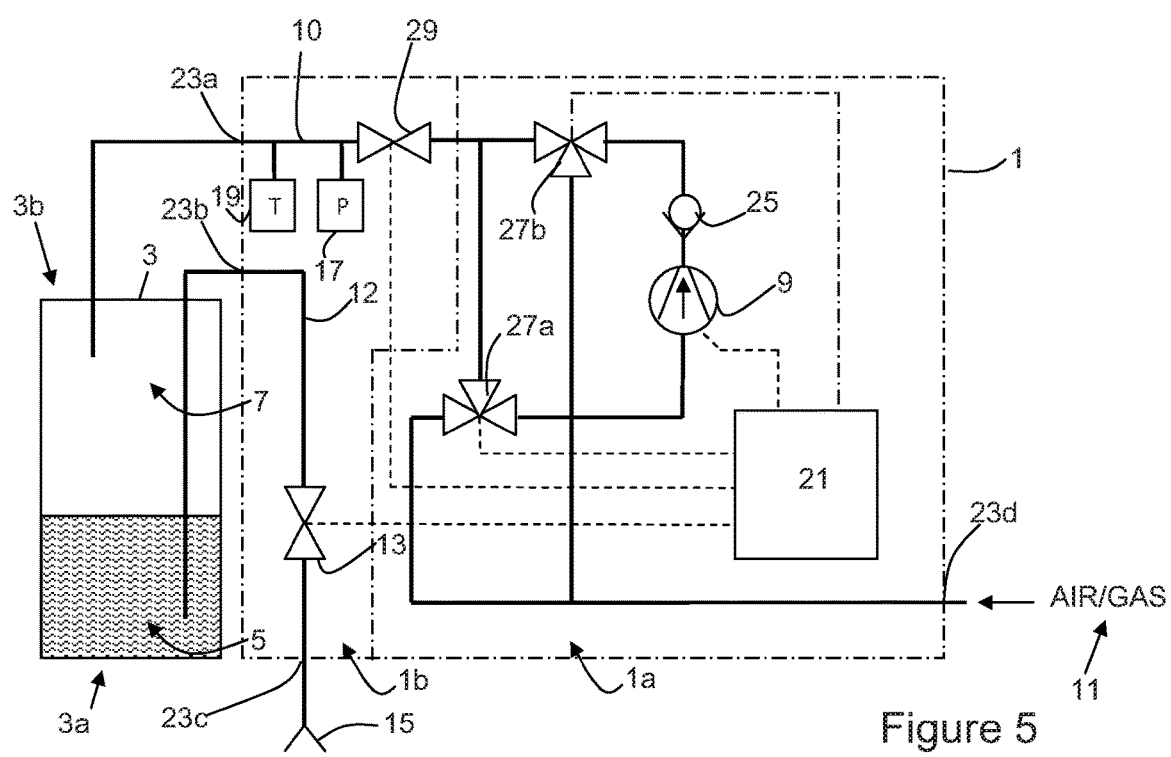
FIG. 5 represents schematically a further variant of an apparatus according to the invention.

FIG. 5 illustrates a partial view of a similar variant in which a unidirectional pump 9 can be used for both dispensing and aspiration. In this variant, a pair of three-way valves 27a, 27b are arranged so as to cause pump 9 to pump gas into or out of chamber 3. This arrangement can also be used in combination with any of the other variants illustrated above.

Another adaptation illustrated in FIG. 5, which is independent of the three-way valve arrangement and can thus be applied in its absence, is that the pressure and temperature sensors 17, 19 have been moved into the dispensing unit, on the chamber-side of a controllable access valve 29 provided in fluid communication between the three-way valves 27a, 27b and the port 23a. Alternatively, the pressure and temperature sensors 17, 19 can be moved into the chamber 3. Such an arrangement permits construction of a manifold dispenser and/or aspirator. By duplicating the dispensing/aspirating unit 1b connected a single control unit 1a can control dispensing and aspiration from a plurality of individual chambers 3 by means of a plurality of dispensing/aspirating units 1b, each connected in fluid communication with a single control unit 1a via its corresponding access valve 29. In such an arrangement, the controller selects the chamber 3 being used by selectively opening the corresponding access valve 29 while leaving the others closed.

Although the invention has been described with reference to specific embodiments, variations thereto are possible without departing from the scope of the invention as defined in the appended claims.

The embodiments of the invention in which an exclusive property or privilege is claimed are defined as follows:

1. A method for dispensing and/or aspirating a fluid, comprising:
    providing an apparatus and a single chamber of unknown internal volume connected thereto, the apparatus being configured to dispense and/or aspirate a predetermined volume $\Delta V$ of fluid from the single chamber, the single chamber comprising a lower portion and an upper portion entirely communicating with each other, the lower portion configured to contain said fluid, the upper portion configured to contain a gas, the apparatus comprising:
        a controllable valve configured to be in fluid communication with the lower portion of the chamber;
        a pressure sensor configured to be in gaseous communication with the upper portion of the chamber;
        a pump configured to be in gaseous communication between a source of gas and the upper portion of the chamber; and
        a controller in operative connection with the controllable valve, the pressure sensor, and the pump, wherein the controller is configured to determine the predetermined volume $\Delta V$ of fluid to be dispensed or aspired from the chamber based on gas pressure measurements from the pressure sensor in the upper portion of the chamber and to control operation of the pump and operation of the controllable valve based on said pressure measurements from the pressure sensor, such that the upper portion of the chamber is in fluid communication with the pump and such that the lower portion of the chamber is in fluid communication with the controllable valve;
    providing fluid in the lower portion of the chamber and a volume $V_1$ of gas in the upper portion of the chamber;
    measuring, by the pressure sensor, an initial pressure $P_0$ in the upper portion of the chamber after providing the fluid and the volume $V_1$ of gas;
    introducing or evacuating a known quantity of gas into or out of the upper portion of the chamber respectively after measuring the initial pressure $P_0$;
    measuring, by the pressure sensor, a first pressure $P_1$ in the upper portion of the chamber by means of the pressure sensor after introducing or evacuating the known quantity of gas;
    determining the volume $V_1$ of gas in the upper portion of the chamber based on said known quantity of gas, said initial pressure $P_0$, and said first pressure $P_1$;
    said volume $V_1$ of gas being determined by the following equation:

$$V_1 = \frac{(n_1 - n_0)RT}{(P_1 - P_0)}$$

wherein $(n_1 - n_0)$ is the number of moles of gas displaced by the pump, R is the ideal gas constant, and T is a temperature measured by a temperature sensor;
    followed by determining a target pressure $P_2$ of the upper portion of the chamber, said target pressure being calculated so as to dispense or to aspirate said predetermined volume $\Delta V$ of fluid;
    followed by opening said controllable valve to dispense fluid while monitoring the pressure in the upper portion of the chamber by means of the pressure sensor; and
    followed by closing said controllable valve once said target pressure $P_2$ is reached and after the predetermined volume $\Delta V$ of fluid is dispensed or aspirated.

2. A method according to claim 1, wherein said known quantity of gas is a predetermined number n of moles of gas.

3. A method according to claim 1, wherein said first pressure $P_1$ is predetermined, and said known quantity of gas is a number n of moles of gas measured so as to attain said predetermined second pressure.

4. A method according to claim 1, wherein $(n_1 - n_0)$ is determined by the equation:

$$(n_1 - n_0) = f_{\Delta n}(P_1) s_0$$

wherein $f_{\Delta n}(P_1)$ is a predetermined calibration curve of the pump, and $s_0$ is a function of the operation of the pump determined by the controller.

5. A method according to claim 4, wherein the pump is a reciprocating pump and $s_0$ is the number of strokes of the pump.

6. A method according to claim 1, wherein the target pressure $P_2$ is determined by the equation:

$$P_2 = \frac{V_1^k}{(V_1 + \Delta V)^k} P_1$$

where $V_1$ is the gas volume within the containment before dispensing, $\Delta V$ the dispensed or aspirated liquid predetermined volume, k the polytropic exponent, and $P_1$ is the pressure in the chamber before dispensing or aspirating.

* * * * *